(12) United States Patent
Kang et al.

(10) Patent No.: US 8,922,043 B1
(45) Date of Patent: Dec. 30, 2014

(54) TIME VARIANT DROOP BASED INERTIAL CONTROL METHOD FOR WIND GENERATOR

(71) Applicant: Industrial Cooperation Foundation Chonbuk National University, Jeonju-si, Jeollabuk-do (KR)

(72) Inventors: Yong Cheol Kang, Jeonju-si (KR); Hyewon Lee, Gimje-si (KR); Min Hwang, Iksan-si (KR)

(73) Assignee: Industrial Cooperation Foundation Chonbuk National University, Jeonju (KR)

( * ) Notice: Subject to any disclaimer, the term of this patent is extended or adjusted under 35 U.S.C. 154(b) by 0 days.

(21) Appl. No.: 14/322,282

(22) Filed: Jul. 2, 2014

(30) Foreign Application Priority Data

Mar. 6, 2014 (KR) .......................... 10-2014-0026606

(51) Int. Cl.
  F03D 9/00 (2006.01)
  H02P 9/04 (2006.01)
  F03D 7/00 (2006.01)

(52) U.S. Cl.
  CPC . *F03D 9/003* (2013.01); *F03D 7/00* (2013.01)
  USPC .............................................. 290/44; 290/55

(58) Field of Classification Search
  USPC .................................................. 290/44, 55
  See application file for complete search history.

(56) References Cited

U.S. PATENT DOCUMENTS

| | | | | | |
|---|---|---|---|---|---|
| 4,276,744 | A | * | 7/1981 | Pisano | 60/791 |
| 4,349,878 | A | * | 9/1982 | Grimm | 702/58 |
| 4,411,595 | A | * | 10/1983 | Pisano | 416/1 |
| 4,674,276 | A | * | 6/1987 | Kitaguchi | 60/39.163 |
| 5,798,633 | A | * | 8/1998 | Larsen et al. | 323/207 |
| 5,832,413 | A | * | 11/1998 | Benco et al. | 702/77 |
| 7,345,373 | B2 | * | 3/2008 | Delmerico et al. | 290/44 |
| 7,528,496 | B2 | * | 5/2009 | Fortmann | 290/44 |
| 7,761,190 | B2 | * | 7/2010 | Delmerico et al. | 700/297 |
| 7,996,116 | B2 | * | 8/2011 | Wiszniewski et al. | 700/295 |
| 8,108,165 | B2 | * | 1/2012 | Benmouyal | 702/75 |

(Continued)

FOREIGN PATENT DOCUMENTS

| KR | 10-0513950 B1 | 11/2005 |
|---|---|---|
| KR | 10-2008-0077161 A | 8/2008 |
| KR | 10-2012-0037990 A | 4/2012 |
| KR | 10-1318124 B1 | 10/2013 |

OTHER PUBLICATIONS

Jinshik Lee et al., "Assignment of the Rotor Speed-based Droop of a Wind Generator for a Wind Power Plant Inertial Control", 2013 Summer Journal of The Korean Institute of Electrical Engineers, pp. 121-122, Seoul, Korea.

(Continued)

*Primary Examiner* — Pedro J Cuevas
(74) *Attorney, Agent, or Firm* — LRK Patent Law Firm

(57) ABSTRACT

A time variant droop-based inertial control method of a wind generator includes the steps of acquiring a nominal frequency value and a system frequency value of a power system; calculating a difference between the system frequency value and the nominal frequency value; calculating a rate of change of the system frequency; acquiring a droop coefficient $R_{variant}$ using the rate of change of the system frequency; and controlling the wind generator based on the difference between the system frequency value and the nominal frequency value and the droop coefficient $R_{variant}$.

6 Claims, 7 Drawing Sheets

(56) References Cited

U.S. PATENT DOCUMENTS

| | | | |
|---|---|---|---|
| 8,129,980 B2* | 3/2012 | Seki | 324/76.39 |
| 8,140,283 B2* | 3/2012 | Benmouyal et al. | 702/72 |
| 8,190,387 B2* | 5/2012 | Seki | 702/75 |
| 2004/0093177 A1* | 5/2004 | Schweitzer et al. | 702/64 |
| 2005/0231871 A1* | 10/2005 | Karimi Ghartemani | 361/86 |
| 2007/0085343 A1* | 4/2007 | Fortmann | 290/44 |
| 2007/0120369 A1* | 5/2007 | Delmerico et al. | 290/44 |
| 2007/0209445 A1* | 9/2007 | Bohr et al. | 73/774 |
| 2007/0222294 A1* | 9/2007 | Tsukida et al. | 307/29 |
| 2008/0111380 A1* | 5/2008 | Delmerico et al. | 290/44 |
| 2009/0254291 A1* | 10/2009 | Benmouyal | 702/75 |
| 2010/0286838 A1* | 11/2010 | Guzman-Casillas et al. | 700/293 |
| 2011/0082654 A1* | 4/2011 | Dickens | 702/60 |
| 2012/0313593 A1* | 12/2012 | Kn ppel et al. | 323/234 |
| 2013/0018521 A1* | 1/2013 | Manson | 700/297 |
| 2013/0169309 A1* | 7/2013 | Bickel | 324/764.01 |
| 2014/0183961 A1* | 7/2014 | Schrock et al. | 307/102 |

OTHER PUBLICATIONS

Il Kwon Moon et al., "Harmonic Compensation of Power Stabilize for Grid-connected Wind Farm", 2012 Summer Journal of The Korean Institute of Electrical Engineers, pp. 809-810, Seoul, Korea.
KIPO Notice of Allowance for Korean Patent Application No. 10-2014-0026606 which corresponds to the above-referenced application.

* cited by examiner

| Section | Rate of change of system frequency | Droop coefficient |
|---|---|---|
| 1 | ~-1 below | 0.01 |
| 2 | -1~-0.2 | 0.01~0.035 |
| 3 | -0.2~0.005 | 0.035~0.08 |
| 4 | 0.005~1 | 0.08~0.1 |
| 5 | 1 above | 0.1 |

FIG. 2

| Time | ......... | t3 | t4 | ......... |
|---|---|---|---|---|
| Rate of change of system frequency | ......... | A | D | ......... |

| Time | ......... | T3' | T4' | ......... |
|---|---|---|---|---|
| Rate of change of system frequency | ......... | C | D | ......... |

FIG. 4B

| Current rate of change of system frequency | Previous rate of change of system frequency | Droop coefficient |
|---|---|---|
| ⋮ | ⋮ | ⋮ |
| D | A | X |
| | B | Y |
| | C | Z |
| ⋮ | ⋮ | ⋮ |

FIG. 4C

TIME VARIANT DROOP BASED INERTIAL CONTROL METHOD FOR WIND GENERATOR

BACKGROUND OF THE INVENTION

1. Field of the Invention

The present invention relates to an inertial control method of a wind generator, and more specifically, to a time variant droop-based inertial control method of a wind generator, which can improve the capability of recovering the reduced frequency in the case of a disturbance using a time variant droop coefficient $R_{variant}$ calculated using a rate of change of the system frequency.

2. Background of the Related Art

If a disturbance such as tripping of a generator or increase of load occurs in a power system, frequency of a power grid decreases since electrical energy is insufficient. For example, in Korea, if the frequency drops below 59 Hz, an Under Frequency Load Shedding (UFLS) relay operates and sheds load by 6% to prevent consecutive tripping of generators and sheds the load by additional 6% at every 0.2 Hz decrease of frequency. Accordingly, a lowest frequency of the power grid after occurrence of disturbance is an important criterion for determining reliability of the power system, and the frequency of the power grid should not be less than 59 Hz in order to prevent load shedding.

Currently, some of wind generators mainly used for generating wind power performs a Maximum Power Point Tracking (MPPT) control by adjusting the speed of a rotor according to the wind speed in order to generate maximum output power. Since such a Maximum Power Point Tracking control does not consider change of the power grid frequency, significant frequency reduction is inevitable when a disturbance occurs in the power grid. A frequency control function of a wind generator is required to prevent the significant frequency reduction.

Conventionally, methods that contribute the frequency stability of a power grid have been proposed, and one of them is a method of adding a reference value generated by a loop of calculating a rate of change of frequency of a power grid to a reference value of an output for performing a Maximum Power Point Tracking control of a wind generator. Although this method may contribute to suppressing frequency reduction of a power system by temporarily releasing kinetic energy stored in the rotor of the wind generator when a disturbance occurs, it has a limit in that contribution to the recovery of frequency becomes less as time passes after the disturbance occurs.

Meanwhile, in most cases, the amount of power released by an inertial response and droop control of operating synchronous machines after the disturbance is larger than the power capacity of a tripped generator. Therefore, after the frequency rebound, and the sign of the rate of change of frequency becomes negative. Accordingly, this method contributes to the recovery of frequency until the frequency rebounds, however, after the frequency rebounds, output power of a wind power plant decreases due to the inverted sign of the rate of change of frequency, and thus a problem of decreasing the contribution to the recovery of frequency will arise as a result.

Patent document 1 has been disclosed as a conventional technique to solve the problem described above. According to the patent document 1, although it has an effect of further promptly recovering frequency when a disturbance occurs and providing a large amount of power to the power grid, if high frequency components exist in the frequency, a problem will arise that a noise, which gives a bad influence on the control of a wind generator, is amplified due to the high frequency components when a differentiation (or a calculation of a rate of change) is performed on the frequency.

SUMMARY OF THE INVENTION

Accordingly, the present invention has been made in view of the above-mentioned problems occurring in the prior art, and it is an object of the present invention to provide an inertial control method of a wind generator, which can rapidly recover frequency by releasing a large amount of power to the power system when a disturbance occurs in a power system.

In addition, another object of the present invention is to prevent a bad influence caused by the high frequency components included in the system frequency when a rate of change of the system frequency is calculated, by converting the rate of change of the system frequency into the corresponding droop coefficient $R_{variant}$.

To accomplish the above objects, according to an aspect of the present invention, there is provided a time variant droop-based inertial control method of a wind generator, the method including the steps of: acquiring a nominal frequency value and a system frequency value of a power system; calculating a difference between the system frequency value and the nominal frequency value; calculating a rate of change of the system frequency; acquiring a droop coefficient $R_{variant}$ using the rate of change of the system frequency; and controlling the wind generator based on the difference between the system frequency value and the nominal frequency value and the droop coefficient $R_{variant}$.

In addition, the inertial control method may further include the step of creating a lookup table, before the step of acquiring a droop coefficient $R_{variant}$ in which in the lookup table, an index is assigned to each of time sections, and a different droop coefficient $R_{variant}$ is matched to each index, and if a value belonging to any one of the time sections is input as an index, a droop coefficient $R_{variant}$ matching to the input index is output.

In addition, the step of acquiring a droop coefficient $R_{variant}$ may include the steps of: inputting the rate of change of the system frequency as an index of the lookup table; and acquiring a droop coefficient $R_{variant}$ matching to an index corresponding to the rate of change of the system frequency from the lookup table.

In addition, the lookup table may store the droop coefficient in advance such that a droop coefficient $R_{variant}$ matching to an index to which a relatively large value is assigned has a value larger than that of a droop coefficient $R_{variant}$ matching to an index to which a relatively small value is assigned.

In addition, the control step may include the steps of: calculating a first active power reference value using Maximum Power Point Tracking control; calculating a second active power reference value based on the difference between the system frequency value and the nominal frequency value and the droop coefficient $R_{variant}$; calculating a power command value by summing the first and second active power reference values; and transferring the power command value to the wind generator.

In addition, a Rotor Side Converter of the wind generator may adjust power output of the wind generator to the power command value.

According to an embodiment of the present invention, there is provided a control method of a wind generator, which can rapidly recover frequency by providing a large amount of power to the power system when a disturbance occurs in a power system.

In addition, when a disturbance occurs in the power system, performance of recovering frequency during the disturbance can be improved by using a rate of change of the system frequency changing along the time.

In addition, since the rate of change of the system frequency is converted into a droop coefficient $R_{variant}$ matching thereto, the lowest system frequency can be increased more successfully, and a bad influence caused by the high frequency components included in the system frequency can be prevented when the rate of change of the system frequency is calculated.

BRIEF DESCRIPTION OF THE DRAWINGS

FIG. 2 is a view showing an example of a first lookup table according to an embodiment of the present invention.

FIG. 3 is a view showing a relation between a rate of change of the system frequency and a droop coefficient $R_{variant}$ as a graph according to the first lookup table of FIG. 2.

FIGS. 4A to 4C are views showing an example of calculating droop coefficients $R_{variant}$ by reflecting the trend of change of the rate of change of the system frequency according to another embodiment of the present invention.

DETAILED DESCRIPTION OF THE PREFERRED EMBODIMENT

The embodiments disclosed in this specification should not be interpreted or used to limit the scope of the present invention. It is apparent to those skilled in the art that the descriptions including the embodiments of the specification have various applications. Accordingly, certain embodiments are only for illustrative purpose and not intended to limit the scope of the present invention to the embodiments as far as the present invention is not limited to the claims. Furthermore, in describing the present invention, if already known functions or specific description of constitution related to the present invention may make the spirit of the present invention unclear, detailed description thereof will be omitted.

Hereinafter, the embodiments of the present invention will be described in more detail with reference to the accompanying drawings.

Figure 1:
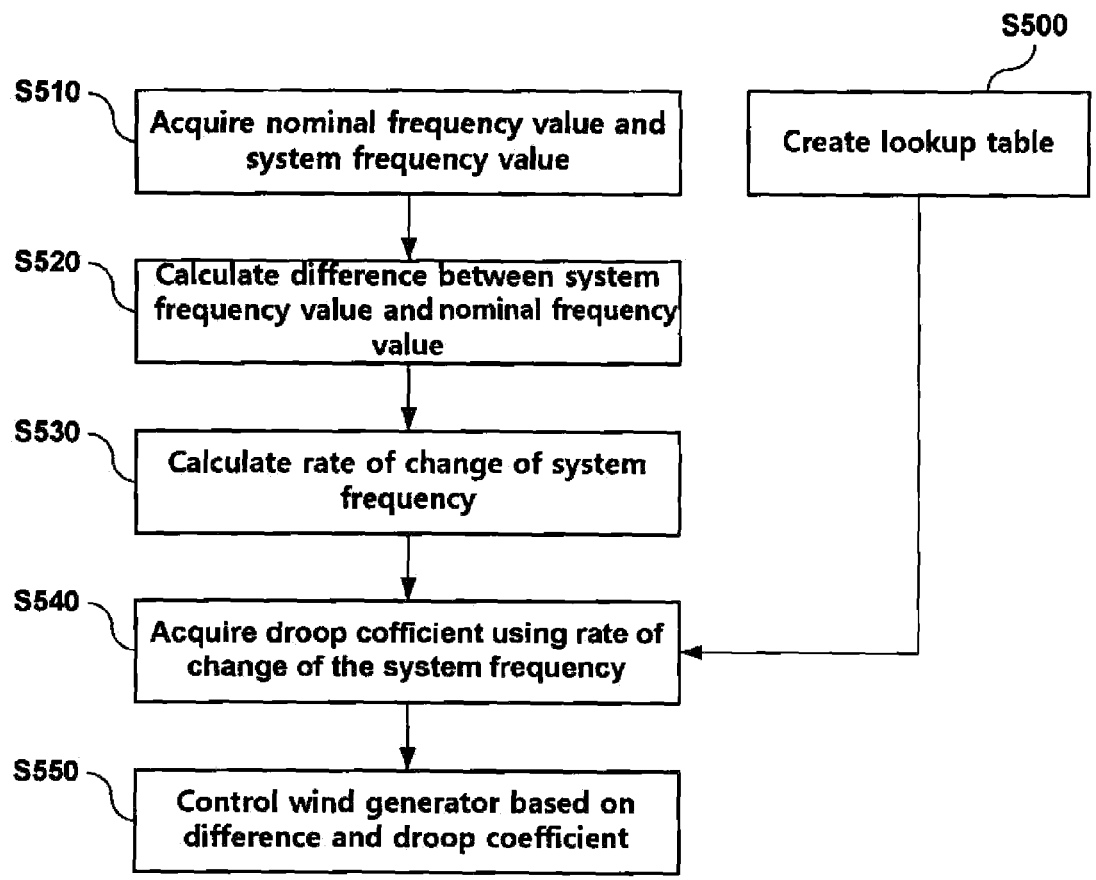
FIG. 1 is a flowchart schematically illustrating the steps of a time variant droop-based inertial control method of a wind generator according to an embodiment of the present invention.

FIG. 1 is a flowchart schematically illustrating the steps of a time variant droop-based inertial control method of a wind generator according to an embodiment of the present invention.

Referring to FIG. 1, the time variant droop-based inertial control method of a wind generator of the present invention includes the steps of: acquiring a nominal frequency $f_{nom}$ value and a system frequency $f_{sys}$ value of a power system S510, calculating a difference between the system frequency $f_{sys}$ value and the nominal frequency $f_{nom}$ value S520; calculating a rate of change of the system frequency $df_{sys}/dt$ S530; acquiring a droop coefficient $R_{variant}$ using the calculated rate of change of the system frequency $df_{sys}/dt$ S540; and controlling the wind generator based on the difference between the system frequency $f_{sys}$ value and the nominal frequency $f_{nom}$ value and the droop coefficient $R_{variant}$ S550.

The nominal frequency $f_{nom}$ of the power system is a constant value of a designated frequency of the power system, and the system frequency $f_{sys}$ is a frequency acquired through a sensor attached to the wind generator or through a main control device or the like for monitoring the power system, which is a value changed by a disturbance or the like.

Next, a difference between the system frequency $f_{sys}$ value and the nominal frequency $f_{nom}$ value of the power system is calculated. Specifically, the difference between the system frequency $f_{sys}$ and the nominal frequency $f_{nom}$ is converted into a numerical value by subtracting a value of the nominal frequency $f_{nom}$ from a value of the system frequency $f_{sys}$. That is, since the difference between the system frequency $f_{sys}$ value and the nominal frequency $f_{nom}$ value is bigger if the disturbance is larger, a degree of disturbance can be determined based on the difference between the system frequency $f_{sys}$ and the nominal frequency $f_{nom}$. In this case, it is natural that the difference between the system frequency $f_{sys}$ and the nominal frequency $f_{nom}$ may have a positive (+) sign or a negative (−) sign.

When a disturbance occurs, the rate of change of the system frequency is calculated according to mathematical expression 1 shown below.

[Mathematical Expression 1]

$$\frac{f_{sys}(t_2) - f_{sys}(t_1)}{t_2 - t_1} \quad \text{[Mathematical expression 1]}$$

In the mathematical expression 1, t1 and t2 denote time of measuring the system frequency $f_{sys}$ in a power system, and $f_{sys}(t1)$ and $f_{sys}(t2)$ are respectively system frequency $f_{sys}$ values measured at time t1 and t2. At this point, it is advantageous in that as time intervals of measuring the system frequency $f_{sys}$ are shorter, the wind generator may further promptly respond to the disturbance.

If the rate of change of the system frequency $df_{sys}/dt$ is calculated through the mathematical expression 1 after the system frequency $f_{sys}$ is measured at predetermined time intervals, a droop coefficient $R_{variant}$ is acquired using the calculated rate of change of the system frequency. Here, the droop coefficient $R_{variant}$ is a control gain of a loop for calculating the second active power reference, which is added to a control block of the wind generator in order to perform inertial control on the wind generator.

Figures 3, 4A:
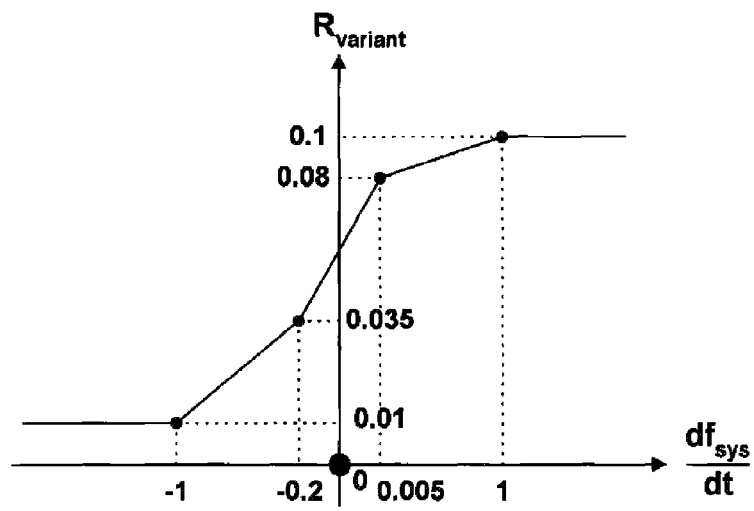

FIG. 2 is a view showing an example of a first lookup table according to an embodiment of the present invention, and FIG. 3 is a view showing a relation between a rate of change of the system frequency $df_{sys}/dt$ and a droop coefficient $R_{variant}$ as a graph according to the first lookup table of FIG. 2.

A rate of change of the system frequency $df_{sys}/dt$ is converted into a droop coefficient $R_{variant}$ if it is input into the first lookup table. Here, the lookup table is a data array in which at least one or more indexes and output values matching to the indexes are stored. That is, the lookup table can be a memory set or a data structure in which previously matched indexes and result values are stored.

In order to calculate a droop coefficient $R_{variant}$ using a first lookup table, the lookup table can be created, i.e., calculated or manufactured, and stored in advance before the step of acquiring a droop coefficient $R_{variant}$ S500.

In such a first lookup table, an index is assigned to each of time sections, and a different droop coefficient $R_{variant}$ is matched to each index, and if a value belonging to any one of the time sections is input as an index, a droop coefficient $R_{variant}$ matching to the input index is output. That is, the step of acquiring a droop coefficient $R_{variant}$ may include the steps of inputting a rate of change of the system frequency $df_{sys}/dt$ as an index of the first lookup table and acquiring a droop coefficient $R_{variant}$ matching to an index corresponding to the rate of change of the system frequency $df_{sys}/dt$ from the first lookup table.

The step of acquiring a droop coefficient $R_{variant}$ may acquire a further larger droop coefficient $R_{variant}$ so that a wind generator release a larger amount of power as the rate of change of the system frequency $df_{sys}/dt$ increases in the negative (−) direction.

Referring to FIGS. 2 and 3, a constant droop coefficient $R_{variant}$ is set to 0.01 if the rate of change of the system frequency $df_{sys}/dt$ belongs to the first section (smaller than −1), the droop coefficient $R_{variant}$ is set to be sequentially increased from 0.01 to 0.035 as the rate of change of the system frequency $df_{sys}/dt$ increases within a range belonging to the second section (larger than or equal to −1 and smaller than −0.2), the droop coefficient $R_{variant}$ is set to be sequentially increased from 0.035 to 0.08 as the rate of change of the system frequency $df_{sys}/dt$ increases within a range belonging to the third section (larger than or equal to −0.2 and smaller than 0.005), the droop coefficient $R_{variant}$ is set to be sequentially increased from 0.08 to 0.1 when the rate of change of the system frequency $df_{sys}/dt$ increases within a range belonging to the fourth section (larger than or equal to 0.005 and smaller than 1), and a constant droop coefficient $R_{variant}$ is set to 0.1 if the rate of change of the system frequency $df_{sys}/dt$ belongs to the fifth section (larger than 1). The rate of change of the system frequency $df_{sys}/dt$ and the droop coefficient $R_{variant}$ may have a positive correlation.

As is disclosed in patent document 1, since the droop coefficient can be inversely proportional to the energy that can be released (or an energy that should be released) from the wind generator to a load, the wind generator may release a large amount of power by acquiring a smaller droop coefficient as the rate of change of the system frequency $df_{sys}/dt$ increases in the negative (−) direction, and thus it may be controlled to further promptly suppress frequency reduction of a power system.

It is advantageous in that magnitude of the droop coefficient $R_{variant}$ from the lookup table can be increased as the rate of change of the system frequency $df_{sys}/dt$ increases, and, as a result, time variant inertial control reflecting a degree of the disturbance is possible.

In addition, when the rate of change of the system frequency $df_{sys}/dt$ belongs to section 1 or section 5 of FIG. 2, the droop coefficient $R_{variant}$ is output constantly by the upper bound (e.g., 0.01) and the lower bound (e.g., 0.1). Accordingly, it is advantageous in that capability of recovering the reduced frequency in the case of a disturbance can be secured by utilizing data on the rate of change of the system frequency $df_{sys}/dt$ when the wind generator performs inertial control, while solving the problem of the conventional technique in which a noise is amplified by the high frequency components included in the system frequency $f_{sys}$ when the rate of change of the system frequency $df_{sys}/dt$ is calculated.

If a droop coefficient $R_{variant}$ is acquired at the step of acquiring a droop coefficient $R_{variant}$, the step of controlling the wind generator based on the difference between the system frequency $f_{sys}$ value and the nominal frequency $f_{nom}$ value and the droop coefficient $R_{variant}$ is performed.

Meanwhile, according to another embodiment of the present invention, the step of acquiring a droop coefficient $R_{variant}$ may calculate a different droop coefficient $R_{variant}$ depending on the rate of change of the system frequency $f_{sys}$ by additionally reflecting a rate of change of the system frequency $df_{sys}/dt$ measured at a time section even when rate of change of the system frequency $df_{sys}/dt$ are the same at the time section. FIGS. 4A to 4C are views showing an example of calculating a droop coefficient $R_{variant}$ by reflecting the trend of the rate of change of the system frequency $f_{sys}$ at measurement time points different from each other according to another embodiment of the present invention.

Referring to FIGS. 4A and 4B, it may be assumed that values of the rate of change of the system frequency $df_{sys}/dt$ measured at different measurement time points t4 and t4' are 'D', which is the same in both cases.

Observing FIG. 4a specifically, it may be confirmed that a value of the rate of change of the system frequency $df_{sys}/dt$ measured at a measurement time point t3 is 'A' and it is changed to 'D' at a next measurement time point t4. In addition, observing FIG. 4b, it may be confirmed that a value of the rate of change of the system frequency $df_{sys}/dt$ measured at a measurement time point t3' is 'C' and it is changed to 'D' at a next measurement time point t4'.

FIG. 4c shows a second lookup table which can generate a droop coefficient $R_{variant}$ reflecting the trend of the rate of change of the system frequency $df_{sys}/dt$ according to an embodiment of the present invention. Referring to FIG. 4c, the second lookup table outputs 'X' as a droop coefficient $R_{variant}$ using 'D' which is a value of the current rate of change of the system frequency and 'A' which is a value of the rate of change at a previous measurement time point as indexes as shown in FIG. 4a. In addition, the second lookup table outputs 'Z' as a droop coefficient $R_{variant}$ using 'D' which is a value of the current rate of change of the system frequency and 'C' which is a value of the rate of change of the system frequency at a previous measurement time point as indexes as shown in FIG. 4b.

That is, in the embodiment described above with reference to FIGS. 2 and 3, the same droop coefficient $R_{variant}$ can be acquired if the rates of change of the system frequency $df_{sys}/dt$ measured at two certain measurement time points are the same, whereas in the embodiment described with reference to FIG. 4, since a droop coefficient $R_{variant}$ is derived by reflecting a value of a rate of change of the system frequency measured at a previous measurement time point, although the rates of change of the system frequency measured at two certain measurement time points are the same, a different droop coefficient $R_{variant}$ may be obtained from the second lookup table if the rates of change of the system frequency measured at a previous measurement time point are different from each other.

Accordingly, the embodiment described above with reference to FIG. 4 is advantageous in that the frequency can be recovered more effectively with respect to the disturbance of a power system. Meanwhile, although a procedure of acquiring a droop coefficient $R_{variant}$ reflecting two consecutive measurement time points is described in the embodiment described above with reference to FIG. 4, it is not limited thereto, but it should be understood that a droop coefficient $R_{variant}$ can be acquired by reflecting three or more consecutive measurement time points.

Figure 5:
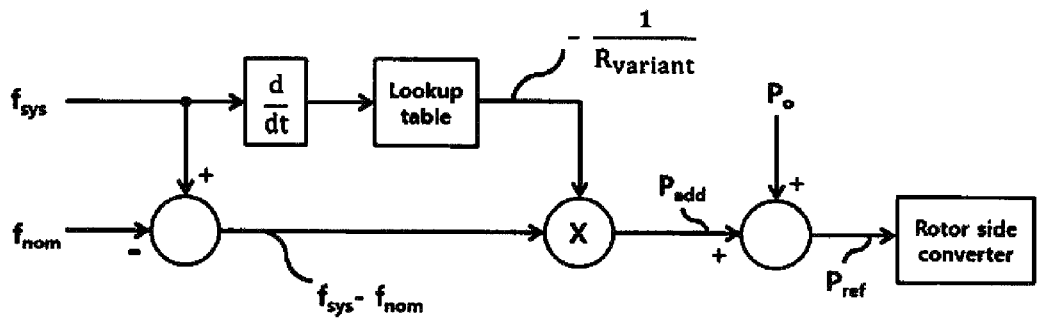
FIG. 5 is a view showing the inertial control method according to an embodiment shown in FIG. 1 in the form of a control loop.

FIG. 5 is a view showing the time variant droop-based inertial control method of a wind generator according to an embodiment shown in FIG. 1 in the form of a control loop.

Referring to FIG. 5, it can be confirmed that a loop for receiving a value of a system frequency $f_{sys}$, calculating a rate of change of the system frequency $df_{sys}/dt$, and acquiring a droop coefficient $R_{variant}$ based on the calculated rate of change of the system frequency $df_{sys}/dt$ is located at the upper portion of the figure, and this is a view expressing the embodiment of the present invention described above with reference to FIG. 1. $P_O$ at the upper portion of FIG. 5 is a reference value for performing a Maximum Power Point Tracking control of the wind generator or controlling active power of the wind generator.

In addition, referring to FIG. 5, the step of controlling the wind generator may include the steps of: calculating a first active power reference value $P_O$ using Maximum Power Point Tracking control, calculating a second active power reference value $P_{add}$ based on the difference between the system frequency $f_{sys}$ value and the nominal frequency $f_{nom}$ value and the acquired droop coefficient $R_{variant}$, calculating a power command value $P_{ref}$ by summing the first active power reference value $P_O$ and the second active power reference value $P_{add}$, and transferring the power command value $P_{ref}$ to the wind generator. At this point, a Rotor Side Converter of the wind generator may receive the power command value $P_{ref}$ and adjust the amount of power output of the wind generator to the power system.

Figure 6:
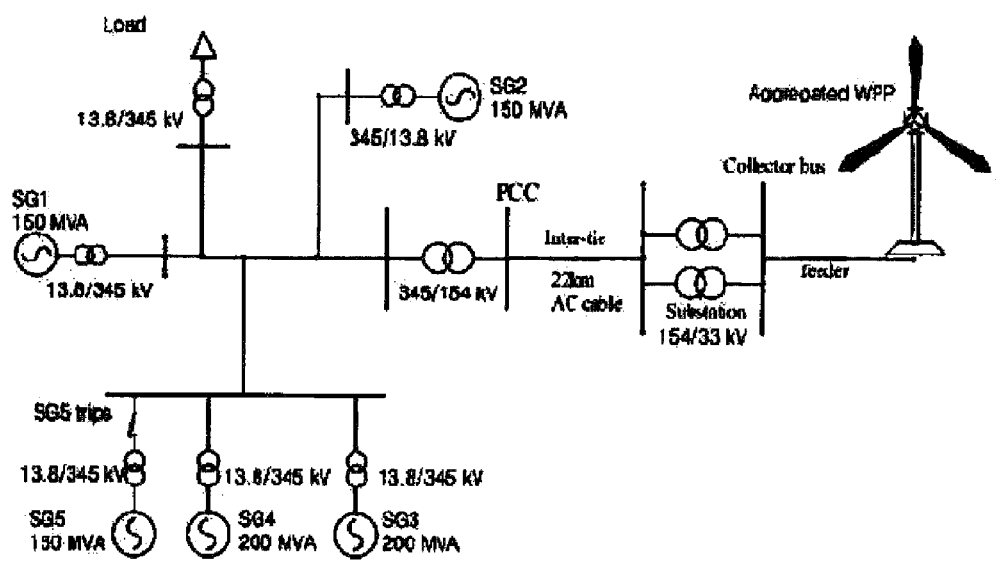
FIG. 6 is a mimetic view showing a model of a wind power plant for simulating an embodiment of the present invention.

FIG. 6 is a mimetic view showing a model system including a wind power plant for simulating an embodiment of the present invention.

A simulation system is configured using an EMTP-RV simulator in order to verify the performance according to an embodiment of the present invention. FIG. 6 shows a simulation system configured of five synchronous generators and a wind power plant. The synchronous generators include three 150 MVA generators and two 200 MVA generators, and a 100 MW wind power plant consisting of 20 units of a 5 MVA DFIG is connected to the power system. The entire power generation capacity is 950 MVA, and active power consumed by the load is 600 MW.

Figure 7A:
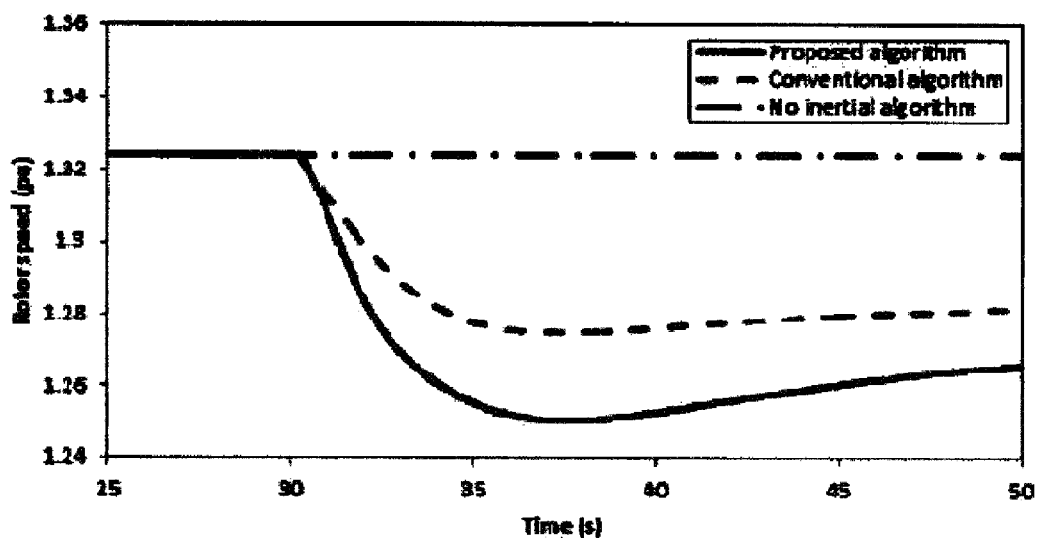
FIGS. 7A to 7C are graphs showing a result of executing the simulation according to FIG. 6.
Figure 7B:
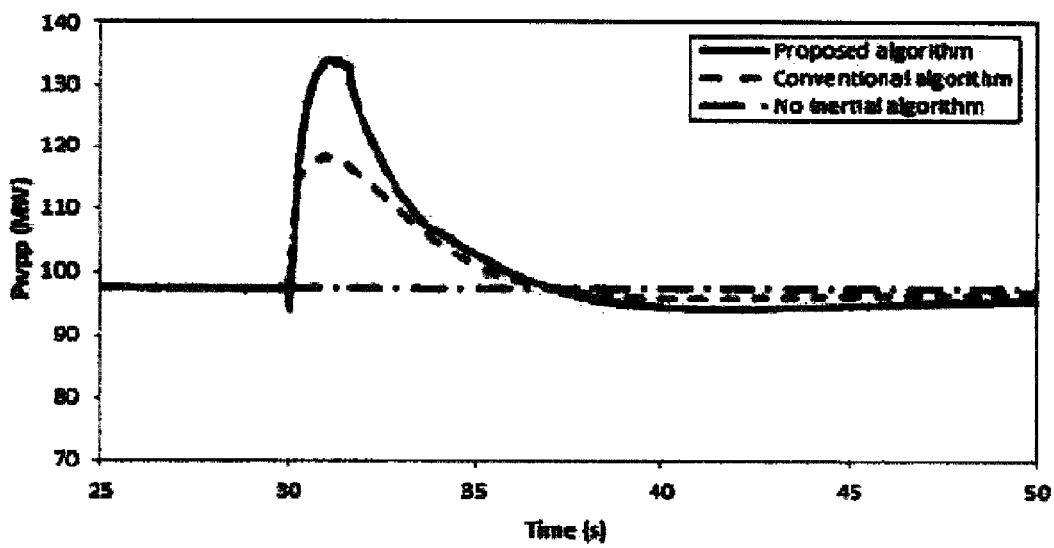
Figure 7C:
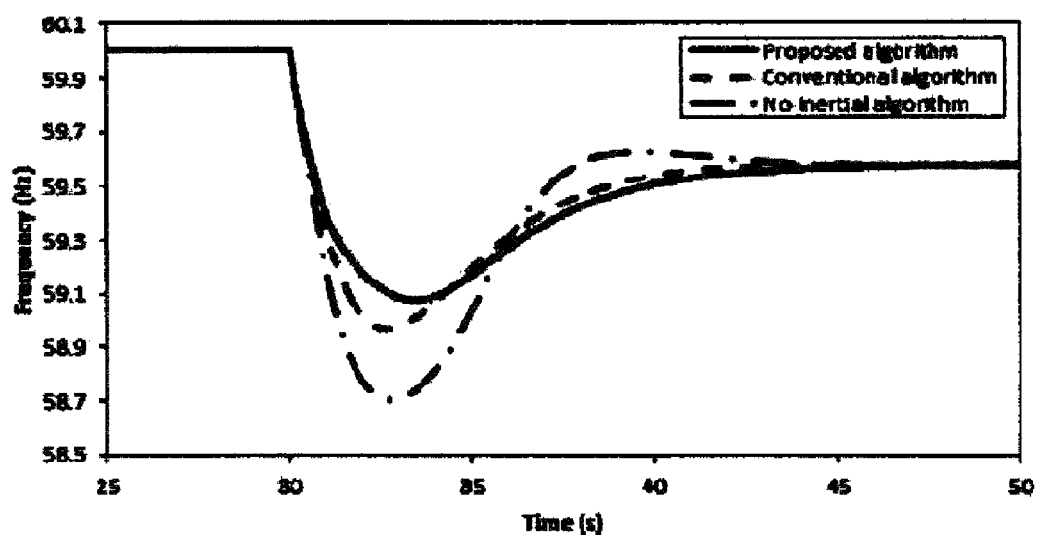

FIGS. 7A to 7C are graphs showing a result of executing the simulation according to FIG. 6. Specifically, FIG. 7A shows the rotor speed according to time when a wind power plant configured of one or more wind generators performs inertial control, FIG. 7B shows the generated output of wind power plant configured of one or more wind generators in order to contribute to the recovery of frequency in the power system, and FIG. 7C shows system frequency $f_{sys}$ along the time when a disturbance occurs in a power grid.

In FIGS. 7A to 7C, the red solid lines represent characteristics of the capability of recovering the reduced system frequency $f_{sys}$ according to an embodiment of the present invention, the green dotted lines represent characteristics of the capability of recovering the reduced system frequency $f_{sys}$ in the case of applying one loop for calculating a reference value proportional to a rate of change of the system frequency $df_{sys}/dt$ and the other loop for generating a reference value proportional to the difference between the system frequency value and the nominal frequency value according to a conventional technique, and the blue dashed lines represent characteristics of the capability of recovering the reduced system frequency $f_{sys}$ in case where only the Maximum Power Point Tracking (MPPT) control is performed, without performing frequency control on the wind generator.

It can be confirmed through FIGS. 7A to 7C that the lowest point of the system frequency $f_{sys}$ is highest (see FIG. 7C) in the embodiment of the present invention shown as the red solid lines, compared with the comparison groups shown as the green dotted lines and the blue dashed lines, by enhancing contribution to the recovery from the decreased system frequency by supplying further more power to the load (see FIG. 7B) at the initial stage of frequency reduction caused by a disturbance occurred in the power system.

That is, according to an embodiment of the present invention, it can be confirmed through FIGS. 7A to 7C that the lowest point of the frequency further increases compared with the comparison groups according to the conventional technique, since the wind power plant releases a large amount of power to the power system when a disturbance occurs in the power system.

As a result, according to an embodiment of the present invention, it is proved through the simulation that the system frequency $f_{sys}$ can be recovered to a higher value than the prior art when a disturbance occurs, and the power system may return to a normal state within a short time.

Meanwhile, operations on the system frequency $f_{sys}$, the nominal frequency $f_{nom}$, the droop coefficient $R_{variant}$, the first active power reference value $P_O$, the second active power reference value $P_{add}$, the power command value $P_{ref}$ and the lookup table can be performed by using at least one or more computer processors, servers or the like provided with data processing and storage functions.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

DESCRIPTION OF SYMBOLS $R_{variant}$: Droop coefficient
$f_{nom}$: Nominal frequency
$f_{sys}$: System frequency
$P_O$: First active power reference value
$P_{add}$: Second active power reference value
$P_{ref}$: Power command value

What is claimed is:

1. A time variant droop-based inertial control method of a wind generator, the method comprising the steps of:
    acquiring a nominal frequency value and a system frequency value of a power system;
    calculating a difference between the system frequency value and the nominal frequency value;
    calculating a rate of change of the system frequency;
    acquiring a droop coefficient $R_{variant}$ using the rate of change of the system frequency; and
    controlling the wind generator based on the difference between the system frequency value and the nominal frequency value and the droop coefficient $R_{variant}$.

2. The method according to claim 1, further comprising the step of creating a lookup table, before the step of acquiring a droop coefficient, wherein
    in the lookup table, an index is assigned to each of time sections, and a different droop coefficient is matched to each index, and if a value belonging to any one of the time sections is input as an index, a droop coefficient matching to the input index is output.

3. The method according to claim 2, wherein the step of acquiring a droop coefficient includes the steps of:
    inputting the rate of change of the system frequency as an index of the lookup table; and
    acquiring a droop coefficient $R_{variant}$ matching to an index corresponding to the rate of change of the system frequency from the lookup table.

4. The method according to claim 2, wherein the lookup table stores the droop coefficient in advance such that a droop coefficient matching to an index to which a relatively large value is assigned has a value larger than that of a droop coefficient matching to an index to which a relatively small value is assigned.

5. The method according to claim 1, wherein the control step includes the steps of:
- calculating a first active power reference value using a Maximum Power Point Tracking control;
- calculating a second active power reference value based on the difference between the system frequency value and the nominal frequency value and the droop coefficient;
- calculating a power command value by summing the first active power reference value and the second active power reference value; and
- transferring the power command value to wind generator.

6. The method according to claim 5, wherein a Rotor Side Converter of the wind generator adjusts power output of the wind generator to the power command value.

* * * * *